(12) United States Patent
Im

(10) Patent No.: US 12,358,421 B2
(45) Date of Patent: Jul. 15, 2025

(54) SELF-DEPLOYABLE TRIPOD FOR VEHICLE

(71) Applicant: INDURAS, INC, Busan (KR)

(72) Inventor: Byung Aun Im, Busan (KR)

(73) Assignee: INDURAS, INC, Busan (KR)

( * ) Notice: Subject to any disclaimer, the term of this patent is extended or adjusted under 35 U.S.C. 154(b) by 109 days.

(21) Appl. No.: 18/287,025

(22) PCT Filed: Apr. 13, 2022

(86) PCT No.: PCT/KR2022/005318
§ 371 (c)(1),
(2) Date: Oct. 16, 2023

(87) PCT Pub. No.: WO2022/220564
PCT Pub. Date: Oct. 20, 2022

(65) Prior Publication Data
US 2024/0190333 A1    Jun. 13, 2024

(30) Foreign Application Priority Data

Apr. 15, 2021 (KR) .................. 10-2021-0049194
Apr. 11, 2022 (KR) .................. 10-2022-0044544

(51) Int. Cl.
*B60Q 1/30* (2006.01)
*B60Q 1/52* (2006.01)

(52) U.S. Cl.
CPC ............ *B60Q 1/3015* (2022.05); *B60Q 1/52* (2013.01)

(58) Field of Classification Search
CPC ................................ B60Q 1/3015; B60Q 1/52
See application file for complete search history.

(56) References Cited

U.S. PATENT DOCUMENTS

| | | | |
|---|---|---|---|
| 10,703,266 B1 * | 7/2020 | Butler | E01F 9/662 |
| 2005/0072350 A1 * | 4/2005 | Aasgaard | B60Q 1/52 340/471 |
| 2014/0169019 A1 * | 6/2014 | Fulton | B60Q 1/52 362/543 |
| 2016/0167576 A1 * | 6/2016 | Lee | B60Q 1/52 116/2 |
| 2017/0210284 A1 * | 7/2017 | Donan | B60Q 1/52 |
| 2017/0243480 A1 * | 8/2017 | Ray | B60Q 1/52 |
| 2020/0039422 A1 * | 2/2020 | Wornham | G09F 13/22 |

(Continued)

FOREIGN PATENT DOCUMENTS

| | | |
|---|---|---|
| EP | 0818353 A2 | 1/1998 |
| JP | H0572578 U | 10/1993 |
| KR | 101537049 B1 | 7/2015 |

(Continued)

*Primary Examiner* — Mohamed Barakat
(74) *Attorney, Agent, or Firm* — Bayramoglu Law Offices LLC

(57) ABSTRACT

An automatically deployed tripod for a vehicle includes a fixing frame formed as a housing having one open side surface, a folding frame having one side coupled to the fixing frame to be folded and inserted into the fixing frame or to be unfolded and protrude out of the fixing frame, and a driving part coupled to the interior of the fixing frame, to fix the folding frame into a folded state, and to release the fixing of the folding frame by an operation of a user and cause the folding frame into an unfolded state.

6 Claims, 8 Drawing Sheets

(56) References Cited

U.S. PATENT DOCUMENTS

2021/0178964 A1* 6/2021 Kilim ...................... G09F 13/16
2021/0221281 A1* 7/2021 Tohikian .............. B60Q 1/2615

FOREIGN PATENT DOCUMENTS

| KR | 101686816 B1 | 12/2016 |
| KR | 101829390 B1 | 2/2018 |
| KR | 101935909 B1 | 1/2019 |
| KR | 102223899 B1 | 3/2021 |

* cited by examiner

SELF-DEPLOYABLE TRIPOD FOR VEHICLE

CROSS REFERENCE TO THE RELATED APPLICATIONS

This application is the national phase entry of International Application No. PCT/KR2022/005318, filed on Apr. 13, 2022, which is based upon and claims priority to Korean Patent Applications No. 10-2021-0049194, filed on Apr. 15, 2021, and No. 10-2022-0044544, filed on Apr. 11, 2022, the entire contents of which are incorporated herein by reference.

TECHNICAL FIELD

The present disclosure relates to a self-deployable tripod for a vehicle and, more particularly, to a self-deployable tripod for a vehicle, the tripod being attached on the inner side of a trunk door and self-deploying in response to a driver's operation in the event of a vehicle failure or accident.

BACKGROUND

In general, when a vehicle has a problem during driving, or when a vehicle is no longer able to drive due to an unexpected accident, it is necessary to stop the vehicle on the side road or at the location where the abnormality occurred and check the state of the vehicle at that location. Accordingly, it is mandatory to have a vehicle safety tripod to protect the driver and passengers and to indicate emergency situations.

Conventional vehicle safety tripods are manufactured in a triangular shape to comply with the relevant regulations and have a light reflector or reflective film on their surface to save costs.

However, due to having the reflector or reflective film attached thereto, such a vehicle safety tripod has a visibility distance of only about 300 meters, and the safety tripod is reflected only when there is an external light source, so the safety tripod cannot function properly if something goes wrong with a vehicle while driving at night, or if an unexpected accident occurs.

Korean Patent No. 10-1935909 discloses a technology for a vehicle safety tripod, which includes a base, a support part, and a light emitting part, and is fixed to the rear body of a vehicle by a magnetic part at the bottom, thereby improving the attachment force of the safety tripod to a vehicle while facilitating the installation of the safety tripod. However, there is a risk that the driver has to go out to the road where the vehicles are traveling in order to install and remove the safety tripod, and the risk of accidents is further increased, especially at night when the driver's vision is difficult to secure.

In addition, Korean Registered Patent No. 10-1686816 discloses a technology for an emergency tripod installation device including a base bracket, a bar holder, an indicating bar, and an indicating bar holding means, which can adjust the angle so that the indicating bar always shines toward the following vehicles regardless of the opening angle of the trunk lid. However, there is a problem in that although due to its a slide manner, the indicating bar can unfold and automatically form a safety tripod, the driver needs to get out of the vehicle and manually push the indicating bar toward the bar holder to store the indicating bar back in the bar holder.

SUMMARY

Technical Problem

Accordingly, the present disclosure has been made to solve above problems occurring in the related art, and an objective of the present disclosure is to provide a self-deployable tripod for a vehicle, the tripod being attached on the inner side of a trunk door and self-deploying according to a driver's operation in the event of a vehicle failure or accident, thereby preventing a secondary accident that may occur immediately after the accident.

The objectives of the present disclosure are not limited to those mentioned above, and other objectives not mentioned will be apparent to one having ordinary skill in the art from the following description.

Technical Solution

In order to achieve the above objectives, according to one aspect of the present disclosure, there is provided a self-deployable tripod for a vehicle, the tripod including: a retaining frame section formed as a housing with one side opened; a foldable frame section coupled at one end to the retaining frame section to be folded and retracted into the retaining frame section or to be unfolded and deployed out of the retaining frame section, the foldable frame section including: a pair of upper foldable bars hingedly and pivotably connected at first ends thereof by an upper hinge axis; a pair of lower foldable bars hingedly and pivotably connected at first ends thereof by a lower hinge axis; and an intermediate foldable part formed between the upper and lower foldable bars and hingedly coupled at both ends to second ends of the upper and lower foldable bars, respectively; and a driving section coupled to the interior of the retaining frame section to allow the foldable frame section to be fixed into a folded state or to be released to an unfolded state in response to a user's manipulation.

The intermediate foldable part may include an intermediate slide portion including a first intermediate slide bar and a second intermediate slide bar engaging with each other and operated such that as the first and second intermediate slide bars slide longitudinally away from or close to each other in a horizontal direction, respectively, so that the intermediate foldable part extends or contracts in length, the pair of upper and lower foldable bars are pivoted to allow the foldable frame section to be retracted into or deployed out of the retaining frame section by the driving section.

The intermediate foldable part may include an extended slide portion including: a pair of extended slide bars respectively coupled to both ends of the intermediate foldable part; a sliding rail portion having upper and lower sliding grooves respectively formed horizontally on upper and lower surfaces of the pair of extended slide bars; a pair of upper sliders respectively pivotably coupled to the second ends of the upper foldable bars and inserted into and horizontally slid along the upper sliding grooves so that the upper foldable bars are foldable; and a pair of lower sliders respectively pivotably coupled to the second ends of the lower foldable bars and inserted into and horizontally slid along the lower sliding grooves so that the lower foldable bars are foldable, the extended slide portion being operated such that as the pair of upper sliders and the pair of lower sliders slide longitudinally away from or close to each other in a horizontal direction, respectively, so that the intermediate foldable part extends or contracts in length, the pair of upper and lower foldable bars are pivoted to allow the foldable frame section to be retracted into or deployed out of the retaining frame section by the driving section.

The driving section may include: a rotary shaft rotatably coupled to the internal side of the retaining frame section to allow the foldable frame section to be retracted into or deployed out of the retaining frame section; a driving motor operated to rotate the rotary shaft; a pair of pulleys coupled to both sides of a middle portion of the rotary shaft; and a pair of wires each connected between the pulley and the foldable frame section to move the foldable frame section as the pulleys rotate.

The driving section may further include a pair of fastening clips each coupled to a foldable frame section-side end of the wire and having fastening protrusions formed at both ends thereof, and the foldable frame section may be provided on one side with fastening grooves formed to correspond to the fastening protrusions, such that the fastening protrusions are fitted into the fastening grooves so that the foldable frame section is fastened inside the retaining frame section.

The foldable frame section may include a plurality of light-emitting portions formed at regular intervals on one side of the foldable frame section to emit light to display a left arrow, a right arrow, or a triangle on the foldable frame section, unfolded by the driving section, in response to a user's manipulation.

Advantageous Effects

The self-deployable tripod for a vehicle according to the present disclosure has the advantage that when mounted and stored in a vehicle body, due to having the foldable configuration, the tripod can be folded and stored without taking up a separate space.

Furthermore, the self-deployable tripod according to the present disclosure has the advantage that since the foldable frame elements are hinge-coupled to each other, the foldable frame elements can be easily replaced by simply disassembling the foldable frame elements that need to be replaced.

Furthermore, the self-deployable tripod according to the present disclosure has the advantage that since the self-deployable tripod is installed inside a vehicle body and in the event of an emergency situation, automatically deploys at the rear of the vehicle, so that the rear-side traveling vehicle can quickly recognize the emergency situation of the front side vehicle and take measures to prevent an accident.

In addition, the self-deployable tripod according to the present disclosure has the advantage that in an emergency situation of a vehicle traveling at a high speed on a highway, the tripod can be safely deployed and retracted during driving without the driver getting out of the vehicle, and the light-emitting portions are illuminated at the same time as the tripod is deployed, so that the tripod can be easily identified even in an environment where it is difficult to secure driving visibility, such as at night and in fog.

DESCRIPTION OF THE REFERENCE NUMERALS IN THE DRAWINGS

Figure 1:
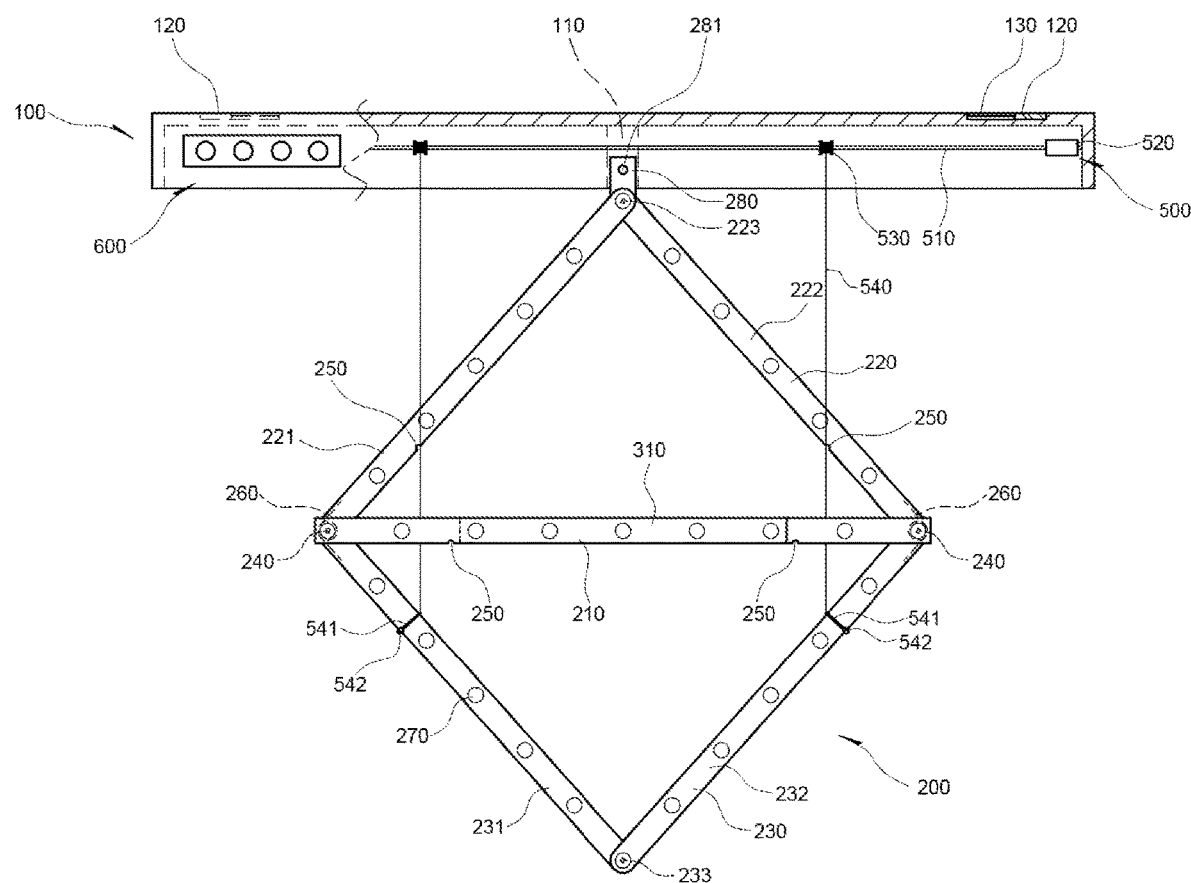
FIG. 1 is a front view illustrating a self-deployable tripod for a vehicle according to one embodiment of the present disclosure.

| | |
|---|---|
| 10: Self-deployable tripod for vehicle | |
| 100: Retaining frame section | |
| 110: Guide groove | 120: Magnet |
| 130: Auxiliary wire | |
| 200: Foldable frame section | |
| 210: Intermediate foldable part | 220: Upper foldable bar |
| 221: $1^{st}$ upper foldable bar | 222: $2^{nd}$ upper foldable bar |
| 223: Upper hinge axis | 230: Lower foldable bar |
| 231: $1^{st}$ lower foldable bar | 232: $2^{nd}$ lower foldable bar |
| 233: Lower hinge axis | 240: Hinge axis |
| 250: Fastening groove | 260: Torsion spring |
| 270: Light-emitting portion | 280: Mounting portion |
| 281: Guide protrusion | |
| 300: Intermediate slide portion | |
| 310: $1^{st}$ intermediate slide bar | 320: $2^{nd}$ intermediate slide bar |
| 400: Extended slide portion | |
| 410: Extended slide bar | 411: Rack gear |
| 420: Sliding rail portion | 421: Upper sliding groove |
| 422: Lower sliding groove | 430: Upper slider |
| 431: Toothed gear | 432: Upper sliding ball |
| 440: Lower slider | 441: Connection piece |
| 442: Lower sliding ball | |
| 500: Driving section | |
| 510: Rotary shaft | 520: Driving motor |
| 530: Pulley | 540: Wire |
| 541: Fastening clip | 542: Fastening protrusion |
| 600: Control section | |
| 700: Communication section | |
| 800: Manipulation section | |
| C: Vehicle | |
| D: Trunk door | |
| B: Vehicle body | |

DETAILED DESCRIPTION OF THE EMBODIMENTS

The advantages and features of the present disclosure and methods of achieving them will become apparent upon reference to embodiments described in detail in conjunction with the accompanying drawings. However, the present disclosure is not limited to the embodiments disclosed herein and will be implemented in many different forms. These embodiments are provided merely to make the present disclosure complete and to fully inform one of ordinary skill in the art to which the invention belongs, and the invention is defined by the scope of the claims.

Embodiments of the present disclosure will now be described in detail with reference to the accompanying drawings. Like part numbers refer to like components throughout the drawings, and "and/or" includes each and every combination of one or more of the recited items.

Although the terms first, second, and the like are used to describe various components, the components are not limited by these terms. These terms are used only to distinguish one component from other components. Thus, a first component referred to herein may also be a second component within the technical scope of the present disclosure.

The terms used herein are intended to describe embodiments, rather than limiting the invention. In this specification, the singular form includes the plural form unless the context specifically states otherwise. The words "comprises" and/or "comprising" as used herein do not exclude the presence or addition of one or more other components in addition to those mentioned.

Unless otherwise defined, all terms used in this specification (including technical and scientific terms) are intended to be used in the sense commonly understood by one of ordinary skill in the technical field to which the invention belongs. In addition, definitions defined by commonly used dictionary are not to be construed ideally or excessively unless expressly defined.

Hereinafter, preferred embodiments of the present disclosure will be described in detail with reference to the accompanying drawings.

Figure 2:
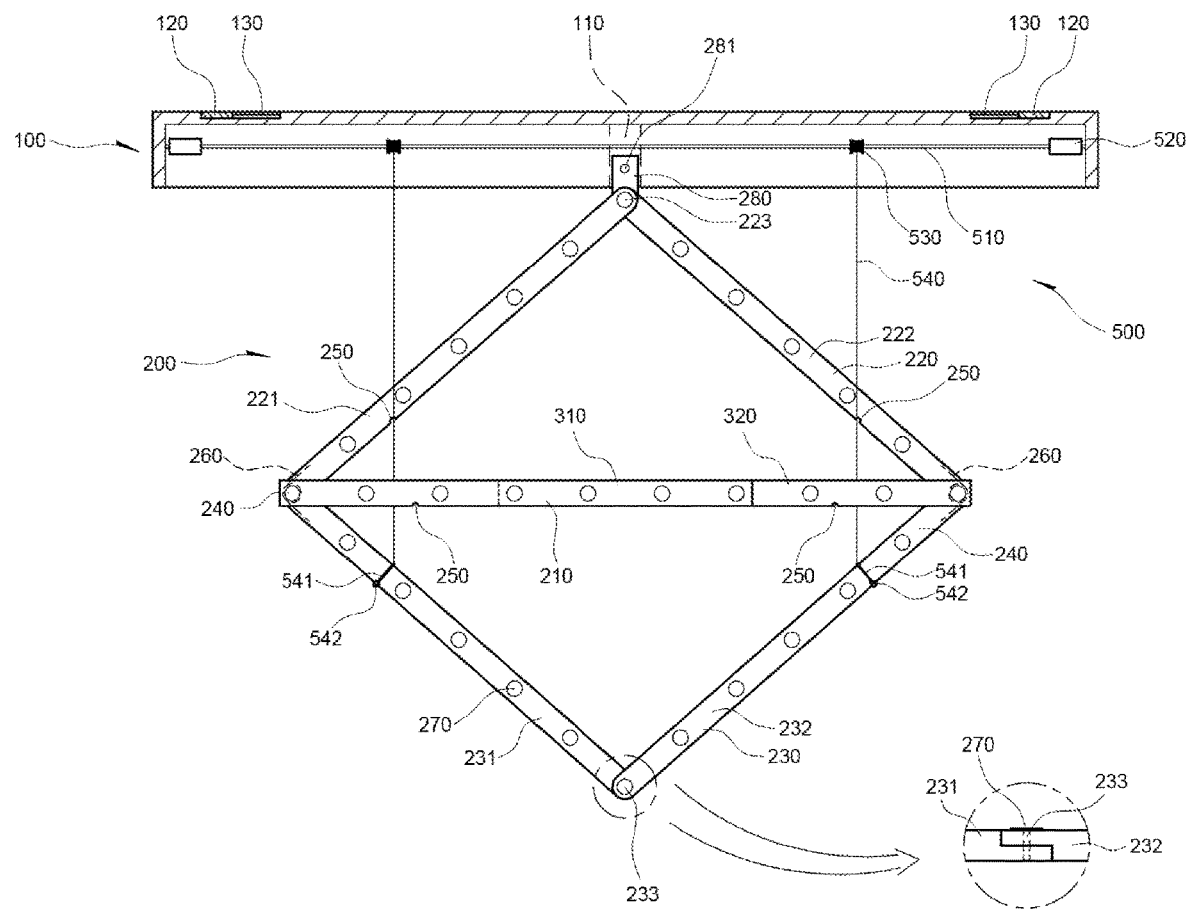
FIG. 2 is a front view illustrating a state of the self-deployable tripod being folded according to one embodiment of the present disclosure.
Figure 2:
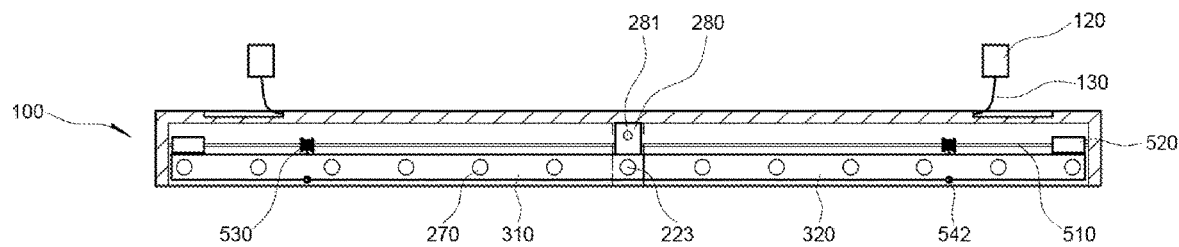

FIG. 1 is a front view illustrating a self-deployable tripod for a vehicle according to one embodiment of the present disclosure, and FIG. 2 is a front view illustrating a state of the self-deployable tripod being folded according to one embodiment of the present disclosure.

As illustrated in FIGS. 1 and 2, the self-deployable tripod for a vehicle according to one embodiment of the present disclosure generally includes a retaining frame section 100, a foldable frame section 200, an intermediate slide portion 300, an extended slide portion 400, a driving section 500, a control section 600, a communication section 700, and a manipulation section 800.

First, the retaining frame section 100 is installed on the inner side of a vehicle trunk door in the form of a rectangular parallelepiped (elongated 'C-type' cross section) housing having an open side through which the foldable frame section 200 can be retracted or deployed.

Here, the retaining frame section 100 may internally have a magnet 120 arranged on the upper side thereof, so that the retaining frame section may be attached to the interior side of a vehicle body by the magnet 120 arranged inside the retaining frame section 100.

Next, the foldable frame section 200 includes a plurality of foldable elements: an intermediate foldable part 210; upper foldable bars 220 consisting of a first upper foldable bar 221 and a second upper foldable bar 222; and lower foldable bars 230 consisting of a first lower foldable bar 231 and a second lower foldable bar 232.

The first upper foldable bar 221 and the second upper foldable bar 222 are pivotably hinge-coupled at first ends thereof by an upper hinge axis 223; the first lower foldable bar 231 and the second lower foldable bar 232 are pivotably hinge-coupled at first ends thereof by a lower hinge axis 233; and the intermediate foldable part 210 is formed between the upper foldable bar 220 and the lower foldable bar 230 such that both ends thereof are respectively hinge-coupled to second ends of the first upper foldable bar 221 and the second upper foldable bar 222, which are hinge-coupled at the first ends thereof by the upper hinge axis 223, and to second ends of the first lower foldable bar 231 and the second lower foldable bar 232, which are hinge-coupled at the first ends thereof by the lower hinge axis 233.

Accordingly, pivoting between the first upper foldable bar 221 and the second upper foldable bar 222, and between the first lower foldable bar 231 and the second lower foldable bar 232 is achieved, so that the foldable frame section 200 is folded and retracted into or unfolded and deployed out of the interior of the retaining frame section 100.

According to a preferred embodiment, ends of the upper foldable bars 220 and the lower foldable bars 230 are rounded to facilitate pivoting between the upper foldable bars 220 and the lower foldable bars 230.

Furthermore, it is preferred that the ends of the upper foldable bars 220 and the lower foldable bars 230 are stepped and hinge-coupled by the hinge axis 240 so that the upper foldable bars 220 and the lower foldable bars 230 are pivoted into a single bar form.

In other words, the ends of the upper foldable bars 220 and the lower foldable bars 230 are formed to be rounded and stepped and are hinge-coupled by the hinge axis 240, so that when the upper foldable bars 220 and the lower foldable bars 230 are pivoted relative to the hinge axis 240, the upper foldable bars 220 and the lower foldable bars 230 do not hit each other, which facilitates easy pivoting of the upper foldable bars 220 and the lower foldable bars 230 into a single bar form.

When the upper foldable bars 220 and the lower foldable bars 230, formed in the shape as described above, are pivoted and retracted into the retaining frame section 100 in the form of a single bar and stored, the upper foldable bars 220 and the lower foldable bars 230 do not take up much space inside the retaining frame section 100, thereby enabling the retaining frame section 100 to be compacted so that the retaining frame section can be easily stored in the interior of a vehicle trunk without occupying much space in the trunk.

Furthermore, according to a preferred embodiment, the foldable frame section 200 may be further provided on an upper side thereof with a mounting portion 280, wherein one side of the mounting portion is hinge-coupled to the upper side of the foldable frame section 200 by the upper hinge axis 223, and another side of the mounting portion 280 is secured to the retaining frame section 100.

In this case, the mounting portion 280 is hinge-coupled on one side to one side of the foldable frame section 200 and is coupled at another side to the retaining frame section 100 such that the mounting portion 280 is moved upwardly along a guide groove 110 formed in the middle of the retaining frame section 100 to allow the foldable frame section 200 to be stably retracted and stored in the interior of the retaining frame section 100.

Furthermore, a guide protrusion 281 may be formed to protrude from the back surface of the mounting portion 280, and a guide groove 110 may be vertically formed on an inner surface of the retaining frame section 100 so that the guide protrusion 281 is inserted into and engaged with the guide groove, allowing the guide protrusion 281 to be guided vertically along the guide groove.

Meanwhile, the intermediate foldable part 210 may include an intermediate slide portion 300. The intermediate slide portion 300 may include a first intermediate slide bar 310 and a second intermediate slide bar 320 engaging with each other and is operated such that as the first and second intermediate slide bars 310 and 320 slide longitudinally away from or close to each other in a horizontal direction, respectively, so that the intermediate foldable part 210 extends or contracts in length, the pair of upper and lower foldable bars 220 and 230 are pivoted to allow the foldable frame section 200 to be retracted into or deployed out of the retaining frame section 100 by the driving section 500.

Preferably, the intermediate foldable part 210 includes a first intermediate slide bar 310 on the left side and a second intermediate slide bar 320 on the right side and is operated such that as the first and second intermediate slide bars 310 and 320, in a stage of being engaged with each other, slide longitudinally away from or close to each other in a left-side or right-side direction, respectively, the intermediate foldable part 210 extends or contracts in length.

Further, the upper foldable bars 220 include a first upper foldable bar 221 and a second upper foldable bar 222, and the lower foldable bars 230 include a first lower foldable bar 231 and a second lower foldable bar 232, wherein the first upper foldable bar 221 and the first lower foldable bar 231 are pivotably hinge-coupled to the left end of the first intermediate slide bar 310, and the second upper foldable bar 222 and the second lower foldable bar 232 are pivotably hinge-coupled to the right end of the second intermediate slide bar 320.

Figure 3A:
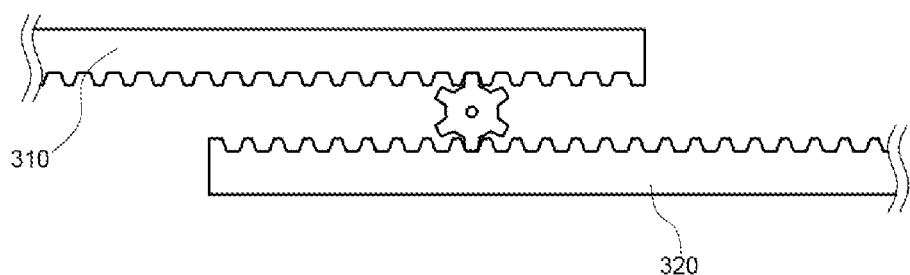
FIGS. 3A to 3D are diagrams illustrating how intermediate slide bars of the self-deployable tripod according to one embodiment of the present disclosure slide away from or close to each other in the left and right directions.

FIGS. 3A to 3D are diagrams illustrating how intermediate slide bars of the self-deployable tripod according to one embodiment of the present disclosure slide away from or close to each other in the left and right directions. According to a preferred embodiment, as illustrated in FIG. 3A, a first rack gear and a second rack gear are formed on one sides of the first intermediate slide bar 310 and the second intermediate slide bar 320 and a pinion is provided between the first rack gear and the second rack gear such that as the pinion is rotated forward and backward, the first rack gear and the second rack gear slide away from or close so that the second intermediate slide bar 320 is withdrawn from or inserted into the first intermediate slide bar 310, thereby causing the intermediate foldable part 210 to slide in left and right directions.

Figure 3B:
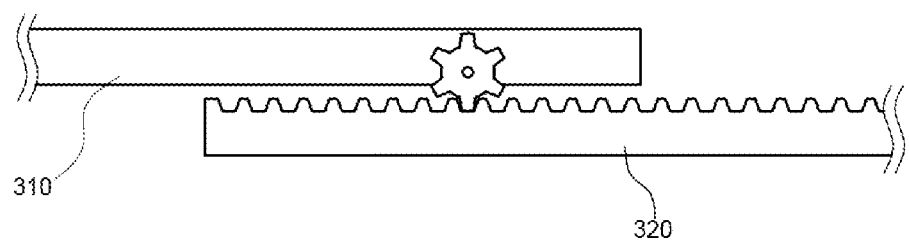

According to another embodiment, as illustrated in FIG. 3B, the first intermediate slide bar 310 is provided on one side thereof with a pinion secured by a fastening pin such that as the pinion is rotated forward and backward along a rack gear formed on the surface of the second intermediate slide bar 320, the second intermediate slide bar 320 is withdrawn from or inserted into the first intermediate slide bar 310, thereby causing the intermediate foldable part 210 to slide in left and right directions.

Figure 3C:
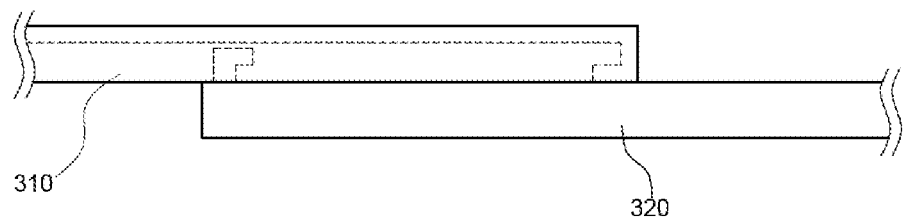

According to a further embodiment, as illustrated in FIG. 3C, a first fastening groove is provided on an inner surface of an end side of the first intermediate slide bar 310, and a first fastening protrusion is provided on a top surface of the second intermediate slide bar 320 to correspond to the first fastening groove such that one side of the first fastening protrusion is formed to protrude in a rightward direction and the first fastening protrusion is inserted and fixed in the first fastening groove. Accordingly, as the second intermediate slide bar 320 is stably withdrawn from or inserted into the first intermediate slide bar 310 by a specified length without the first intermediate slide bar 310 and the second intermediate slide bar 320 being separated upon the receipt of an external impact, the intermediate foldable part 210 slides in the left and right directions.

Figure 3D:
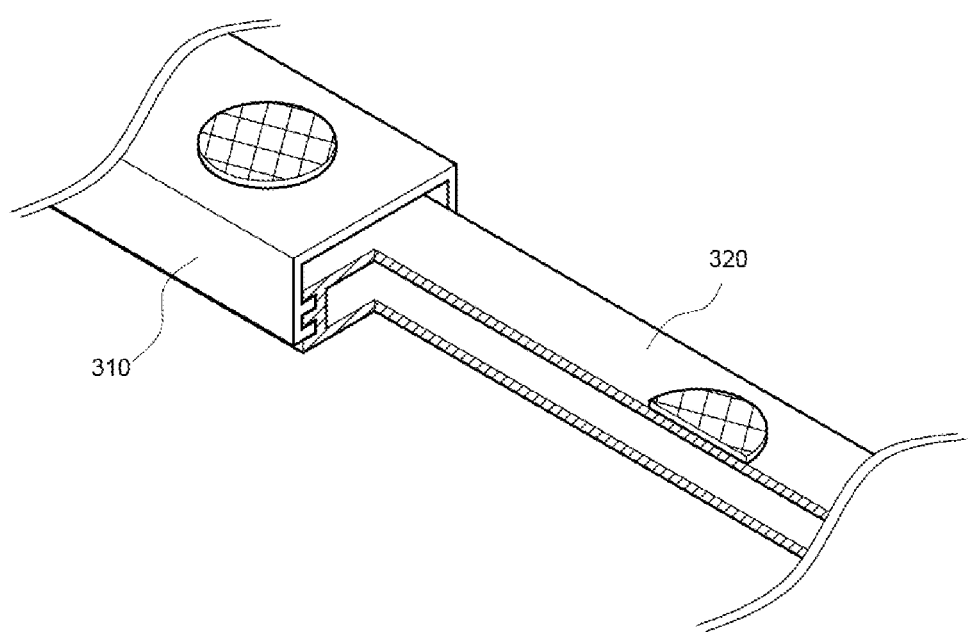

Further, as illustrated in FIG. 3D, the first intermediate slide bar 310 is provided with at least one second fastening protrusion on upper and lower inner walls and the second intermediate slide bar 320 is provided with a fastening rail formed to correspond to the second fastening protrusion such that as the second fastening protrusion is moved in left and right directions along the fastening rail, the second intermediate slide bar 320 is withdrawn from or inserted into the first intermediate slide bar 310 so that the intermediate foldable part 210 slides in left and right directions.

The above withdrawal or insertion manner in the intermediate foldable part 210 is only an embodiment, and the sliding means provided on the first intermediate slide bar 310 and the second intermediate slide bar 320 may be switched between the intermediate slide bar 310 and the second intermediate slide bar 320.

Figure 4:
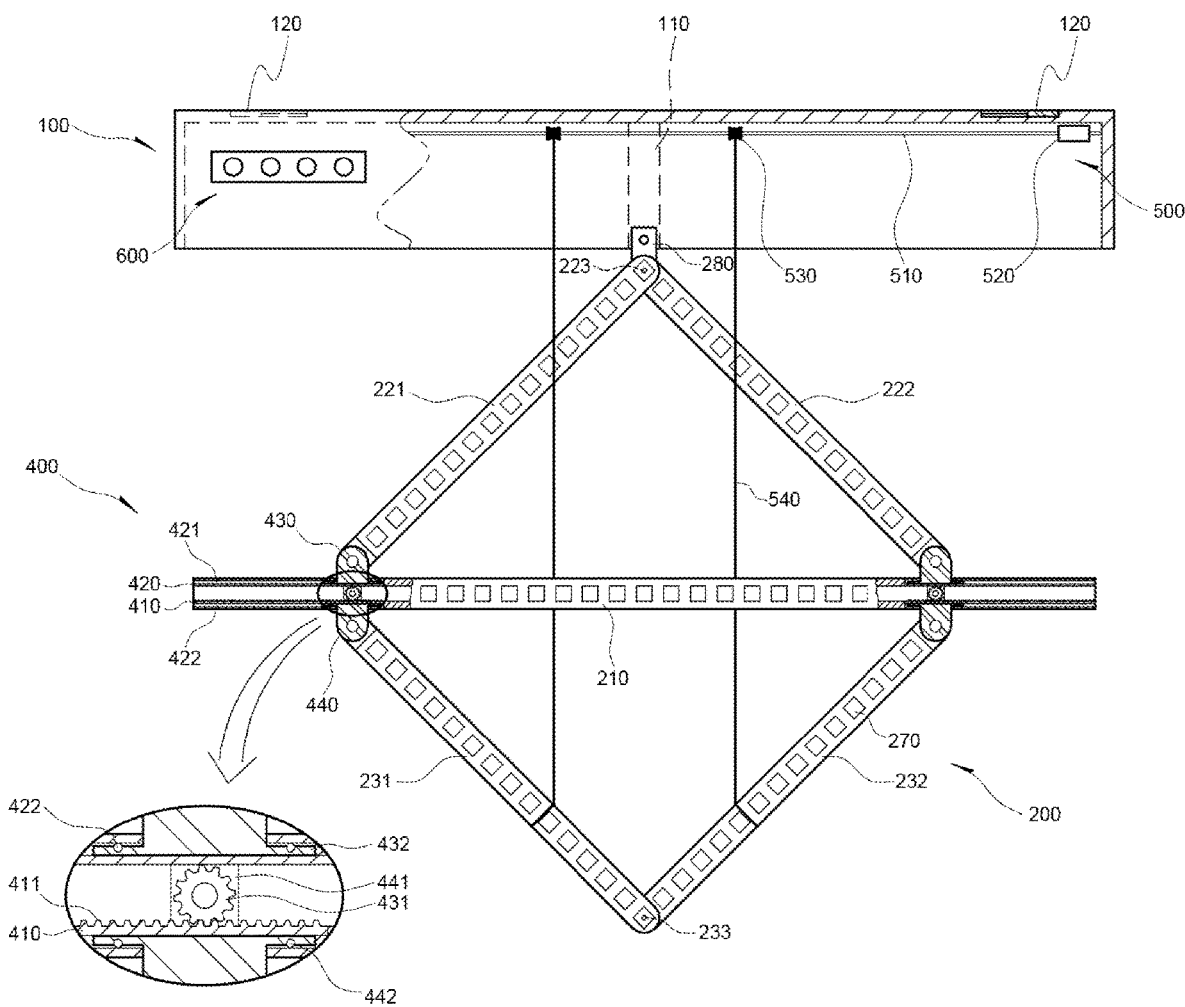
FIG. 4 is a front view illustrating a self-deployable tripod for a vehicle according to another embodiment of the present disclosure.
Figure 5:
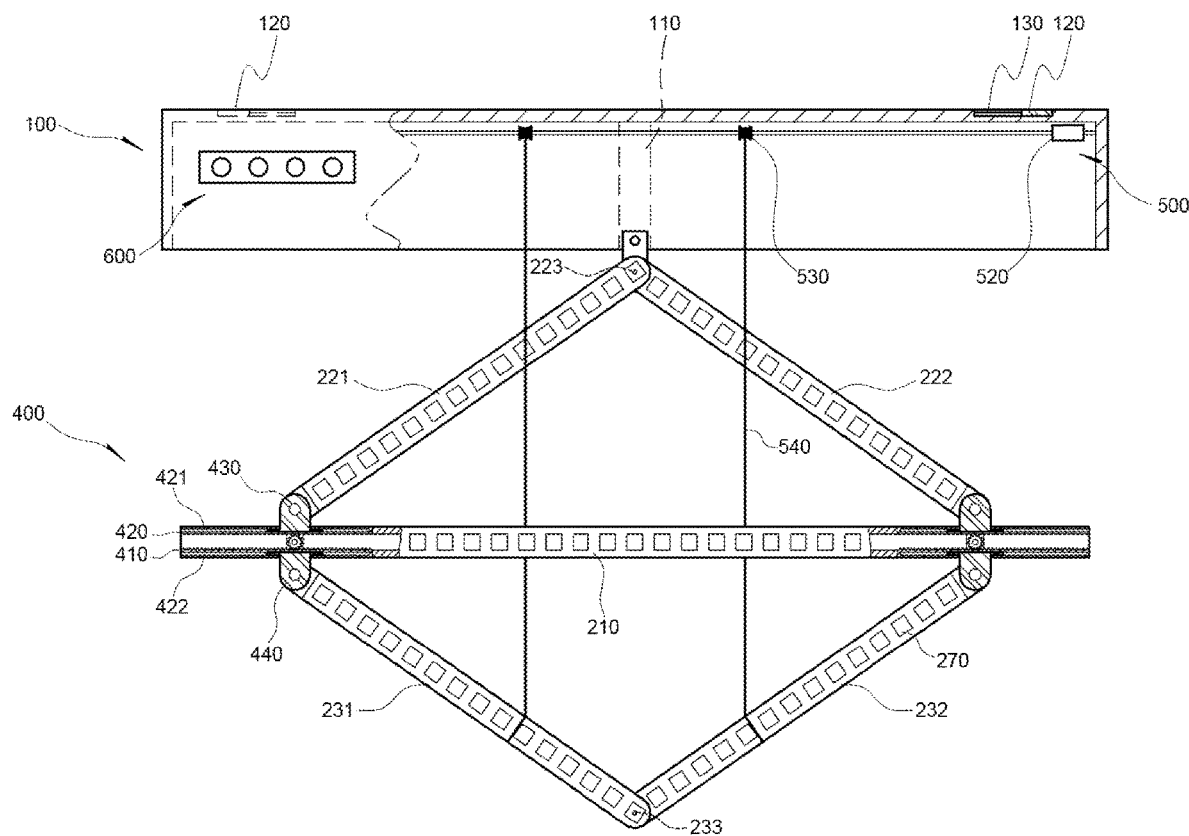
FIG. 5 is a front view illustrating a state of the self-deployable tripod according to the embodiment of the present disclosure being folded.

FIG. 4 is a front view illustrating a self-deployable tripod for a vehicle according to another embodiment of the present disclosure, and FIG. 5 is a front view illustrating a state of the self-deployable tripod according to the embodiment of the present disclosure being folded. As illustrated in FIGS. 4 and 5, the intermediate foldable part 210 may include an extended slide portion 400 including: a pair of extended slide bars 410 respectively coupled to both ends of the intermediate foldable part 210; a sliding rail portion 420 having upper and lower sliding grooves 421 and 422 respectively formed horizontally on upper and lower surfaces of the pair of extended slide bars 410; a pair of upper sliders 430 respectively pivotably coupled to the second ends of the upper foldable bars 220 and inserted into and horizontally slid along the upper sliding grooves 421 so that the upper foldable bars 220 are foldable; and a pair of lower sliders 440 respectively pivotably coupled to the second ends of the lower foldable bars 230 and inserted into and horizontally slid along the lower sliding grooves 422 so that the lower foldable bars 230 are foldable. The extended slide portion 400 is operated such that as the pair of upper sliders 430 and the pair of lower sliders 440 slide longitudinally away from or close to each other in a horizontal direction, respectively, so that the intermediate foldable part 210 extends or contracts in length, the pair of upper and lower foldable bars 220 and 230 are pivoted to allow the foldable frame section 200 to be retracted into or deployed out of the retaining frame section 100 by the driving section 500.

In this case, the intermediate foldable part 210 may be disposed parallel to the retaining frame section 100 between the upper foldable bars 220 and the lower foldable bars 230.

The sliding rail portion 420 may be connected to both ends of the intermediate foldable part 210, respectively, and may have the upper sliding groove 421 and the lower sliding groove 422 formed on the upper and lower surfaces, respectively, in left and right directions.

At both ends of the intermediate foldable part 210, the extended slide bars 410 may be installed to extend through the longitudinal middle of the sliding rail portion 420 in order to reinforce mechanical rigidity in the interior of the sliding rail portion 420 when the intermediate foldable part 210 is connected with the sliding rail portion 420.

The upper sliders 430 may be pivotably connected to the second ends of the upper foldable bars 220, respectively, and inserted into the upper sliding groove 421 of the sliding rail portion 420, respectively, and slidingly movable in the horizontal direction such that the upper foldable bars 220 are foldable.

The lower sliders 440 may be pivotably connected to the second ends of the lower foldable bars 230, respectively, and inserted into the lower sliding groove 422 of the sliding rail portion 420, respectively, and slidingly movable in the horizontal direction such that the lower foldable bars 230 are foldable.

That is, the foldable frame section 200 may be operated such that as the upper foldable bars 220, the intermediate foldable part 210, and the lower foldable bars 230 are lowered and the upper sliders 430 and the lower sliders 440 slide outwards along the upper sliding groove 421 and the lower sliding groove 422 of the sliding rail portion 420, respectively, the upper foldable bard 220 may be unfolded in a mountain shape above the intermediate foldable part 210 and the lower foldable bars 230 may be unfolded in a valley shape below the intermediate foldable part 210.

Here, the upper slider 430 and the lower slider 440, which are vertically adjacent to each other, may be integrally connected to each other by means of a connection piece 441 so as to move in a left or right direction at the same time, thereby facilitating a simple foldable movement.

Further, the foldable frame section 200 may be further provided with an upper sliding ball 432 and a lower sliding ball 442 to allow the upper sliders 430 and the lower sliders 440 to move smoothly from side to side when sliding on the sliding rail portion 420.

The upper sliding ball 432 may be mounted on a top surface of the upper slider 430 to roll thereon such that the upper end protrudes upwardly and comes into contact with the sliding rail portion 420 to further facilitate movement of the upper slider 430 through a rolling motion occurring due to friction with the sliding rail portion 420 during side-to-side movement of the upper slider 430.

The lower sliding ball 442 may be mounted on a bottom surface of the lower slider 440 to roll thereon such that the lower end protrudes downwardly and comes into contact with the sliding rail portion 420 to further facilitate movement of the lower slider 440 through a rolling motion occurring due to friction with the sliding rail portion 420 during side-to-side movement of the lower slider 440.

Meanwhile, a toothed gear 431 may be rotatably installed on the connection piece 441 and rack gears 411 may be respectively installed longitudinally on both inner circumferential sides of the intermediate foldable part 210 to engage with the toothed gear 431, such that the upper foldable bars 220 and the lower foldable bars 230 are unfolded on the intermediate foldable part 210 in a balanced manner on both sides without being biased to the left or right when the foldable frame section 200 is withdrawn and unfolded downwardly from the retaining frame section 100.

Next, the driving section 500 is coupled to the interior side of the retaining frame section 100, and includes a rotary shaft 510, a driving motor 520, a pulley 530, and a wire 540 to allow the foldable frame section 200 to be fixed into a folded state or to be released to an unfolded state in response to a user's manipulation.

The rotary shaft 510 is formed in the form of a rod and rotatably coupled inside the retaining frame section 100 to allow the foldable frame section 200 to be retracted into or deployed out of the retaining frame section 100.

The driving motor 520 is formed on one side of the rotary shaft 510 to rotate the rotary shaft 510. For example, the driving motor 520 may be a penetrating-type motor for rotating the rotary shaft 510 on one side, and the rotary shaft 510 coupled to the driving motor 520 may be rotated by the rotational force of the driving motor 520.

The pulleys 530 are coupled to both sides of the middle portion of the rotary shaft 510, and the wires 540 each are connected to the pulley 530 on one side and to the foldable frame section 200 on the other side to move the foldable frame section 200 as the pulleys 530 rotate.

Thus, the foldable frame section 200 may be folded and retracted into or unfolded and deployed out of the interior of the retaining frame section 100 by the driving section 500.

Specifically, according to the present disclosure, when the wire 540 is wound by the rotation of the pulley 530 so that the foldable frame section 200 is folded and retracted into the retaining frame section 100, the foldable frame section 200 is stacked in a row in the order of the intermediate foldable part 210, the lower foldable bars 230 and the upper foldable bars 220 so that the intermediate foldable part is retracted and stored in the form of a straight bar.

Furthermore, according to the present disclosure, when the wire 540 is unwound by rotation of the pulleys 530 and the foldable frame section 200 is unfolded and deployed out of the retaining frame section 100 by its own weight, the hinge connection between the intermediate foldable part 210, the lower foldable bars 230, and the intermediate foldable part 210 causes the intermediate foldable part 210 and the lower foldable bars 230 to pivot into a rhombus shape.

At this time, as illustrated in FIGS. 1 and 2, in order to continuously maintain the rhombic shape of the foldable frame section 200, a torsion spring 260 may be further provided. The torsion spring 260 is provided in the portion of the foldable frame section that is hingedly coupled by the hinge axis 240 between the intermediate foldable part 210 and the upper foldable bars 220 and between the intermediate foldable part 210 and the lower foldable bars 230, so as to provide a force to automatically stretch the portion only by a certain angle.

Furthermore, the foldable frame side-end of the wire 540 may be further provided with a fastening clip 541, which is coupled to the first lower foldable bar 231 and the second lower foldable bar 232, so as to force the first lower foldable bar 231 and the second lower foldable bar 232 to unfold from the intermediate foldable part 210 only by a certain angle. This prevents the rhombus-shaped tripod from swaying in the forward and backward directions in order to avoid the problem that the foldable frame section 200 is not properly supported and sways or twists in the direction due to external forces such as strong winds generated by vehicles passing from the rear.

Furthermore, the fastening clip 541 has fastening protrusions 542 formed at both ends and the first upper foldable bar 221, the second upper foldable bar 222, and the intermediate foldable part 210 has fastening grooves 250 formed to correspond to the fastening protrusions 542 such that the fastening protrusions are fitted into the fastening grooves 250 to stably fix the foldable frame section 200 retracted into the retaining frame section 100.

According to a preferred embodiment, the fastening protrusions 542 are formed at both ends of the fastening clip 541 to be thicker than the body of the fastening clip 541 so as to be engaged in the fastening grooves 250. The shape of the fastening protrusions 542 may be spherical, rectangular, square, or any other shape.

Furthermore, the fastening clip 541 may be formed in various shapes, such as a "C" shape, a "⊏" shape, a "U" shape, an "I" shape, and the shape of the fastening clip 541 may be freely changed.

Preferably, the fastening clip 541 is formed in a 'U' shape so as to engage the inner surfaces of the first lower foldable bar 231 and the second lower foldable bar 232, such that when the foldable frame section 200 is retracted inside the retaining frame section 100 while the wire 540 is wound around the pulley 530 by the rotation of the pulley 530 so that the first lower foldable bar 231 and the second lower foldable bar 232 coupled to the fastening clip 541 are raised, the fastening protrusion 542 of the fastening clip 541 coupled to the first lower foldable bar 231 is fitted into the fastening grooves 250 formed at the first ends of the first upper foldable bar 221 and the intermediate foldable part 210, and the fastening protrusion 542 of the fastening clip 541 coupled to the second lower foldable bar 232 is fitted into the fastening grooves 250 formed at the second ends of the second upper foldable bar 222 and the intermediate foldable part 210, so that the fastening clips 541 secure and prevent the foldable frame section 200 from being automatically unfolded and deployed out of the inside the retaining frame section 100 by its own weight.

In another example, the fastening clip 541 is formed in a 'c' shape to be coupled with the back of the first lower foldable bar 231 and the second lower foldable bar 232 such that the fastening protrusions 542 formed at both ends of the fastening clip 541 are formed differently from each other.

In this case, the fastening protrusions 542 are formed on the top and bottom of the front side of the fastening clip 541 such that the fastening protrusions 542 formed on the top of the front side of the fastening clip 541 may be bent into a hook shape. The fastening protrusions 542 may be formed so as not to be caught in the fastening grooves 250 to simply hold the first lower foldable bar 231 and the second lower foldable bar 232 as the first lower foldable bar 231 and the second lower foldable bar 232 are raised.

Furthermore, the fastening protrusion 542 formed on the front lower portion of the fastening clip 541 is formed to extend rearward so as to be fitted into the fastening groove 250 formed in the intermediate foldable part 210.

Thus, as the first lower foldable bar 231 and the second lower foldable bar 232 are raised in order to stably secure and store the foldable frame section 200 inside the retaining frame section 100, the fastening protrusion 542 formed on the lower side of the fastening clip 541 engaged with the first lower foldable bar 231 is fitted into the fastening grooves formed on one side of the intermediate foldable part 210 and on the first upper foldable bar 221, and the fastening protrusion 542 formed on the lower side of the fastening clip 541 engaged with the second lower foldable bar 232 is fitted into the fastening grooves 250 formed on the other side of the intermediate foldable part 210 and on the first lower foldable bar 231, so that the foldable frame section 200 is fixed without being automatically unfolded and deployed out of the retaining frame section 100 by its own weight.

Figure 6A:
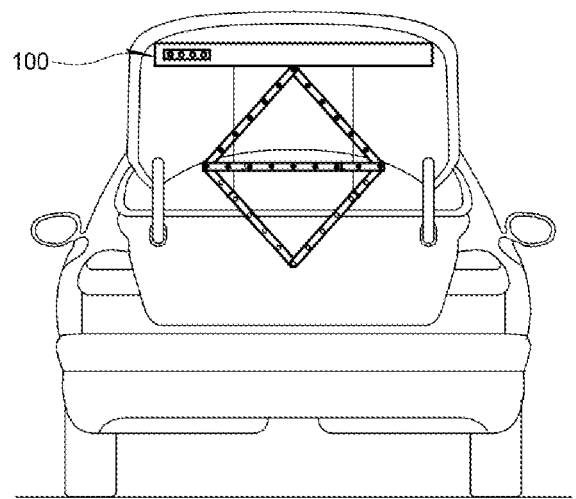
FIGS. 6A to 6C are diagrams illustrating installed states of the self-deployable tripod according to one embodiment of the present disclosure.
Figure 6B:
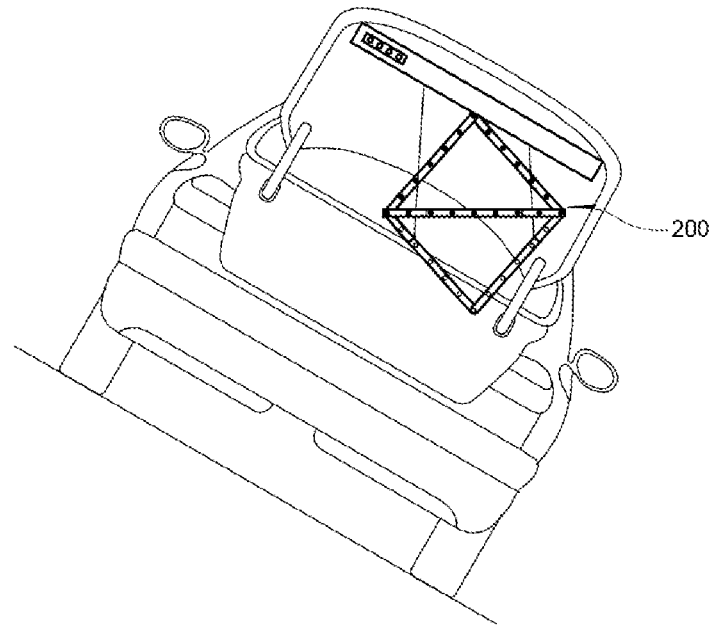
Figure 6C:
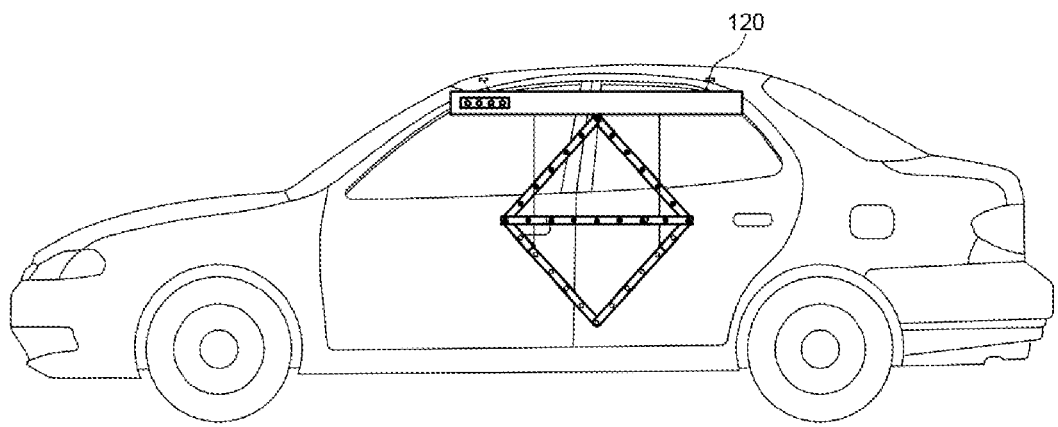

FIGS. 6A to 6C are diagrams illustrating installed states of the self-deployable tripod according to one embodiment of the present disclosure.

As illustrated in FIG. 6B, the mounting portion 280 may be further provided with a weight (not shown), which enables the retaining frame section 100 to maintain a corresponding inclination regardless of the fixed inclination, so that a situation does not occur in which the foldable frame section 200 is twisted by external environmental conditions, such as windy weather, a vehicle slopping road, or the like so that the rear-side traveling vehicles misunderstand the pattern of the foldable frame section 200.

In other words, no matter what environment the foldable frame section 200 is exposed to, the inclination is maintained by the weight, so that the rear-side traveling vehicles can recognize the pattern of the foldable frame section 200 more clearly.

Furthermore, as illustrated in FIG. 6C, the self-deployable tripod attached to the trunk with the magnets 120 can be detached and attached to the lateral side of the vehicle with the magnets 120 so that the rear-side traveling vehicles can recognize the situation in which the front vehicle had an accident even if the vehicle is inverted 90 degrees due to a vehicle accident.

Specifically, the magnets 120, which are connected and inserted inside the retaining frame section 100 via an auxiliary wire 130, are taken out of the interior of the retaining frame section 100 and attached to the door or roof of the vehicle to allow the self-deployable tripod to be fixed to the lateral side of the vehicle so that the rear-side traveling vehicles can recognize the situation in which the front-side vehicle had an accident.

According to a preferred embodiment, the auxiliary wire 130 is formed from an elastic material and is connected with the magnet 120 on one side and with the retaining frame section 100 on the other side such that the auxiliary wire 130 connected with the retaining frame section 100 is stored inside the retaining frame section 100 in a wound state so that the auxiliary wire 130 can be withdrawn according to the height of an attachment site of the vehicle to facilitate the attachment of the magnets 120.

Figure 7A:
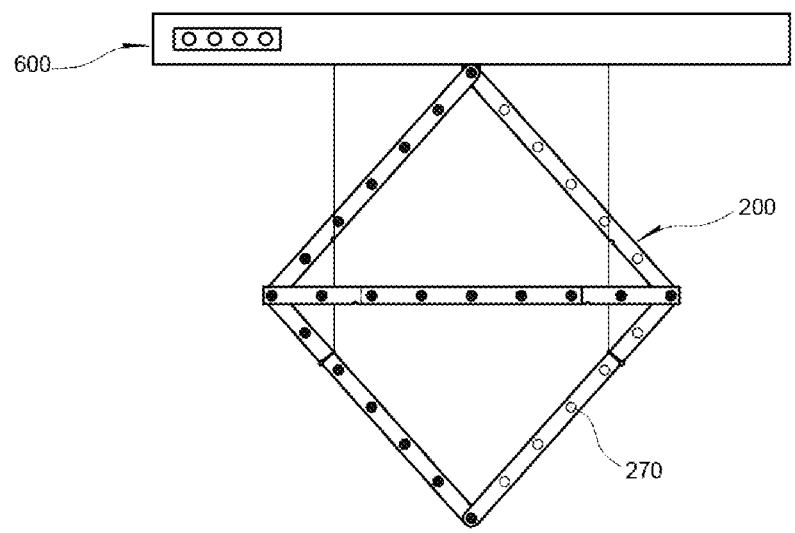
FIGS. 7A to 7C are diagrams illustrating operational states of a foldable frame section of the self-deployable tripod according to one embodiment of the present disclosure.
Figure 7B:
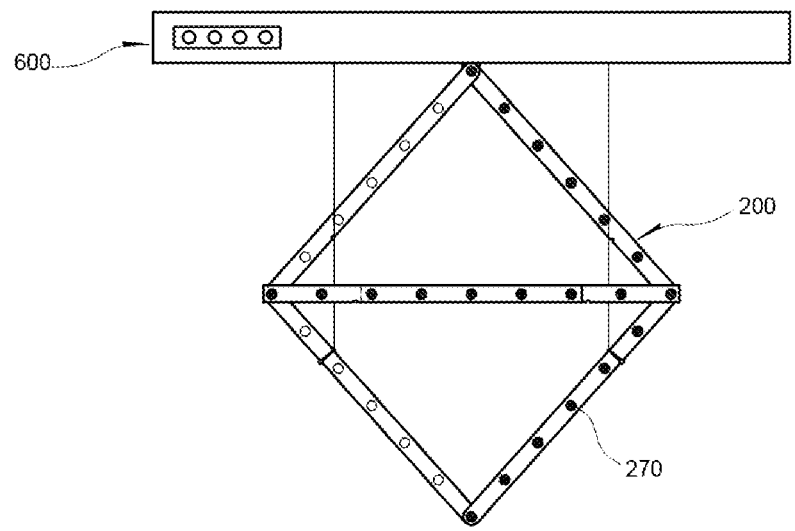
Figure 7C:
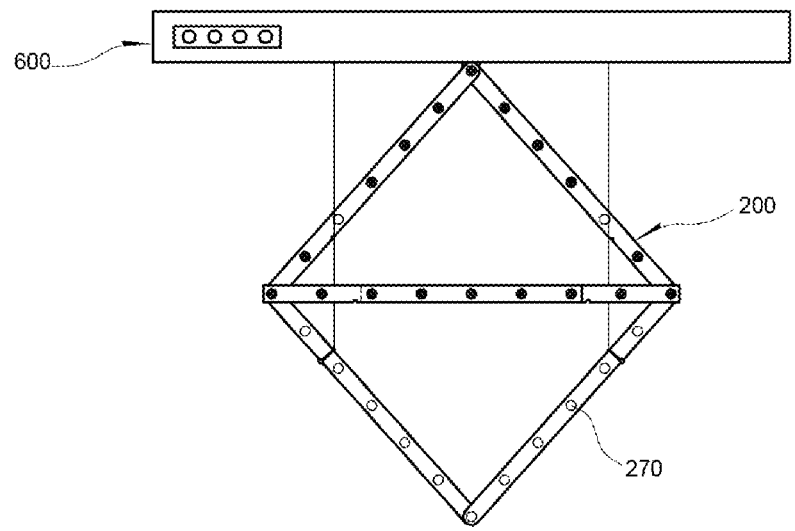

FIGS. 7A to 7C are diagrams illustrating operational states of a foldable frame section of the self-deployable tripod according to one embodiment of the present disclosure.

As illustrated in FIGS. 7A to 7C, the foldable frame section 200 may be provided with a plurality of light-emitting portions 270 on one side, and when the foldable frame section 200 is unfolded by the driving section 500, various patterns may be formed using the plurality of light-emitting portions 270 according to a user's manipulation.

Here, the plurality of light-emitting portions 270 may preferably be LED lamps.

In one example, a left arrow pattern formed by flashing the first upper foldable bar 221, the first lower foldable bar 231, and the intermediate foldable part 210; a right arrow pattern formed by flashing the second upper foldable bar 222, the second lower foldable bar 232, and the intermediate foldable part 210; and a triangle pattern formed by flashing the first upper foldable bar 221, the second upper foldable bar 222, and the intermediate foldable part 210 may be formed.

As such, the foldable frame section 200 may utilize the plurality of light-emitting portions 270 to form a triangular pattern, left and right arrow patterns, and the like to indicate an emergency situation to following traveling vehicles.

The plurality of light-emitting portions 270 may be supplied with electricity using a power line utilizing a battery of the vehicle or an internal rechargeable battery or the like. In this case, the rechargeable battery (not shown) may be normally charged from the vehicle's battery.

Figure 8:
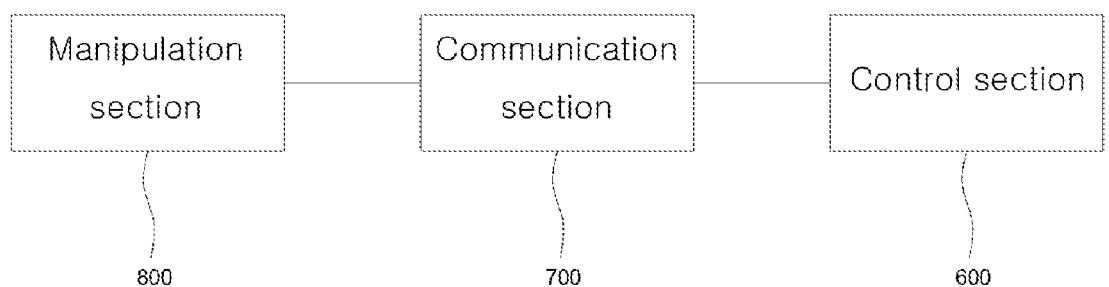
FIG. 8 is a block diagram illustrating the configuration for manipulating a display of the self-deployable tripod according to a preferred embodiment of the present disclosure.

FIG. 8 is a block diagram illustrating the configuration for manipulating a display of the self-deployable tripod according to a preferred embodiment of the present disclosure.

As illustrated in FIG. 8, the self-deployable tripod for a vehicle according to a preferred embodiment of the present disclosure may further include a control section 600, a communication section 700, and a manipulation section 800.

The control section 600 may be interfaced with an emergency light or a shock detection unit of the vehicle to control the foldable frame section 200, and may operate the foldable frame section 200 in the event that the emergency light of the vehicle remains operational for a preset period of time, or in the event that a shock detection signal is received from the shock detection unit. That is, the control section 600 may illuminate the foldable frame section 200 with the plurality of light-emitting portions 270.

Furthermore, the control section 600 may control the foldable frame section 200 by receiving a manipulation signal of the manipulation section 800 from the communication section 700, and may turn on the plurality of light-emitting portions 270 to form a triangular shape, left and right arrow shapes, and the like by receiving the manipulation signal from the manipulation section 800.

In this way, the control section 600 may be used to induce the rear-side traveling vehicles to change lanes by turning on the plurality of light-emitting portions 270 to form a plurality of patterns.

At this time, a communication section 700 may be further provided to receive a manipulation signal from the manipulation section 800 according to a user's manipulation, and the communication section 700 may be in wireless communication with the manipulation section 800.

Here, the wireless communication may utilize a known near field communication method, such as Bluetooth, Zigbee, infrared, etc.

On the other hand, although the communication section 700 and the manipulation section 800 are shown here as being connected by wireless communication, the present disclosure is not limited thereto, and they may be connected to each other by a power supply line, a signal transmission line, or the like for power supply and manipulation signal transmission.

The manipulation section 800 may generate a manipulation signal for controlling the foldable frame section 200 according to a user's manipulation. At this time, the manipulation signal may include inputs such as an illumination mode and an operation mode of the foldable frame section 200, and the manipulation section 800 may be directly installed on the retaining frame section 100.

Furthermore, the manipulation section 800 may be a remote controller (not shown) for transmitting manipulation signals remotely, and may be installed directly on the vehicle.

As such, the self-deployable tripod for a vehicle according to a preferred embodiment of the present disclosure may form a plurality of light-emitting patterns. In one example, the control section 600 may turn on the plurality of light-emitting portions 270 of the foldable frame section 200 to display a triangle pattern, left and right arrow patterns, etc.

For example, when a vehicle is stopped on the right-side road, the plurality of light-emitting portions 270 may flash a left arrow pattern to indicate the situation of the front-side vehicle and guide the rear-side traveling vehicles to change lanes.

In addition, when a vehicle is stopped on the primary roadway, the plurality of light-emitting portions 270 may flash a right arrow pattern to indicate the situation in which the front-side vehicle had an accident and guide the rear-side traveling vehicles to change lanes.

In addition, the plurality of light-emitting portions 270 may flash a triangular shape pattern to indicate the situation in which the front-side vehicle had an accident and guide the rear-side traveling vehicles to change lanes.

Thus, the self-deployable tripod is installed inside a vehicle body and in the event of an emergency situation, automatically deploys at the rear of the vehicle, so that the rear-side traveling vehicle can quickly recognize the emergency situation of the front side vehicle and take measures to prevent an accident.

In addition, in an emergency situation of a vehicle traveling at a high speed on a highway, the self-deployable tripod can be safely deployed and retracted during driving without the driver getting out of the vehicle, and the light-emitting portions are illuminated at the same time as the tripod is deployed, so that the tripod can be easily identified even in an environment where it is difficult to secure driving visibility, such as at night and in fog.

Although embodiments of the present disclosure have been described above with reference to the accompanying drawings, one having ordinary knowledge in the technical field to which the present disclosure belongs will understand that the present disclosure may be implemented into other specific forms without changing its technical ideas or essential features. Therefore, the embodiments described above are to be understood as being exemplary and non-limiting in all respects.

What is claimed is:

1. A self-deployable tripod for a vehicle, comprising:
 a retaining frame section formed as a housing with one side opened;
 a foldable frame section coupled at one end to the retaining frame section to be folded and retracted into the retaining frame section or to be unfolded and deployed out of the retaining frame section, the foldable frame section comprising:
  a pair of upper foldable bars hingedly and pivotably connected at first ends of the upper foldable bars by an upper hinge axis;
  a pair of lower foldable bars hingedly and pivotably connected at first ends of the lower foldable bars by a lower hinge axis; and
  an intermediate foldable part formed between the upper foldable bars and the lower foldable bars and hingedly coupled at both ends to second ends of the upper foldable bars and second ends of the lower foldable bars, respectively; and
 a driving section coupled to an interior of the retaining frame section to allow the foldable frame section to be fixed into a folded state or to be released to an unfolded state in response to a user's manipulation.

2. The self-deployable tripod for the vehicle according to claim 1, wherein the intermediate foldable part comprises an intermediate slide portion comprising a first intermediate slide bar and a second intermediate slide bar engaging with each other and operated such that as the first intermediate slide bar and the second intermediate slide bar slide longitudinally away from or close to each other in a horizontal direction, respectively, so that the intermediate foldable part extends or contracts in length, the pair of upper foldable bars and the pair of lower foldable bars are pivoted to allow the foldable frame section to be retracted into or deployed out of the retaining frame section by the driving section.

3. The self-deployable tripod for the vehicle according to claim 1,
 wherein the intermediate foldable part comprises an extended slide portion comprising:
  a pair of extended slide bars respectively coupled to both ends of the intermediate foldable part;
  a sliding rail portion having upper sliding grooves and lower sliding grooves respectively formed horizontally on upper and lower surfaces of the pair of extended slide bars;
  a pair of upper sliders respectively pivotably coupled to the second ends of the upper foldable bars and inserted into and horizontally slid along the upper sliding grooves so that the upper foldable bars are foldable; and
  a pair of lower sliders respectively pivotably coupled to the second ends of the lower foldable bars and inserted into and horizontally slid along the lower sliding grooves so that the lower foldable bars are foldable, the extended slide portion being operated such that as the pair of upper sliders and the pair of lower sliders slide longitudinally away from or close to each other in a horizontal direction, respectively, so that the intermediate foldable part extends or contracts in length, the pair of upper foldable bars and the pair of lower foldable bars are pivoted to allow the foldable frame section to be retracted into or deployed out of the retaining frame section by the driving section.

4. The self-deployable tripod for the vehicle according to claim 1,
wherein the driving section comprises:
   a rotary shaft rotatably coupled to an internal side of the retaining frame section to allow the foldable frame section to be retracted into or deployed out of the retaining frame section;
   a driving motor operated to rotate the rotary shaft;
   a pair of pulleys coupled to both sides of a middle portion of the rotary shaft; and
   a pair of wires each connected between the pulley and the foldable frame section to move the foldable frame section as the pulleys rotate.

5. The self-deployable tripod for the vehicle according to claim 4, wherein the driving section further comprises a pair of fastening clips each coupled to a foldable frame section-side end of the wire and having fastening protrusions formed at both ends of the fastening clips, wherein the foldable frame section is provided on one side with fastening grooves formed to correspond to the fastening protrusions, such that the fastening protrusions are fitted into the fastening grooves so that the foldable frame section is fastened inside the retaining frame section.

6. The self-deployable tripod for the vehicle according to claim 1, wherein the foldable frame section comprises a plurality of light-emitting portions formed at regular intervals on one side of the foldable frame section to emit light to display a left arrow, a right arrow, or a triangle on the foldable frame section, unfolded by the driving section, in response to a user's manipulation.

* * * * *